United States Patent [19]

Frechet et al.

[11] Patent Number: 5,130,343
[45] Date of Patent: Jul. 14, 1992

[54] PROCESS FOR PRODUCING UNIFORM MACROPOROUS POLYMER BEADS

[75] Inventors: Jean M. J. Frechet; Frantisek Svec; Ken Hosoya, all of Ithaca, N.Y.

[73] Assignee: Cornell Research Foundation, Inc., Ithaca, N.Y.

[21] Appl. No.: 668,589

[22] Filed: Mar. 13, 1991

[51] Int. Cl.$^5$ .................................... C08J 9/26
[52] U.S. Cl. ............................ 521/62; 521/63
[58] Field of Search ............................ 521/62, 63

[56] References Cited

U.S. PATENT DOCUMENTS

| 3,007,896 | 11/1961 | Claseu | 521/61 |
| 5,047,438 | 9/1991 | Feibush | 521/61 |
| 5,055,494 | 10/1991 | Van der Meer | 521/61 |

OTHER PUBLICATIONS

Cheng et al., Abstract 241A from AICHE Chicago 1990 Conference held Nov. 11–16, 1990.
Cheng et al., "Monodisperse Macroporous Styrene-Divinylbenzene Copolymer Particles" paper presented at Chicago 1990 AICHE Conference, Nov. 11–16, 1990.

*Primary Examiner*—Morton Foelak
*Attorney, Agent, or Firm*—Bruce F. Jacobs

[57] ABSTRACT

A process for producing macroporous polymer beads from a multiphase emulsion using soluble polymer particles as the primary porogen is disclosed. The beads produced are of uniform size and shape.

16 Claims, No Drawings

PROCESS FOR PRODUCING UNIFORM MACROPOROUS POLYMER BEADS

BACKGROUND OF THE INVENTION

Polymer beads are usually produced by free radical suspension polymerization, a well-known process developed in 1909 [F. Hofmann and K. Delbruck, Ger. Pat. 250,690 (1909)]. The most important use of porous beads based on poly[styrene-co-divinylbenzene] is in the synthesis of ion-exchange resins. Significant specialty materials markets exist in areas related to separation science (e.g. water purification, high-performance liquid chromatography, etc.).

While a suspension polymerization technique is simple, the beads that are currently obtained therefrom lack size uniformity, i.e. they generally have a broad particle size distribution. However, for some applications (e.g. chromatography, calibrations, diagnostics) beads of uniform size are required. Uniform size beads can be obtained by size classification of the product obtained by a suspension polymerization, but this is tedious and only provides a low yield of the most useful fractions. Japanese Kokai No. Sho. 53-86802 describes a typical suspension polymerization technique.

To circumvent this problem, i.e. to eliminate the handling of large quantities of waste beads and the size classification process, uniform beads ranging in size from about 1–100 $\mu$m have been produced by multi-step swelling polymerizations according to the disclosures of, c.f. Ugelstad (U.S. Pat. Nos. 4,186,120 and 4,336,173) and Hattori et al. (Japanese Kokai Tokyo Koho JP 61-190,504; 61-215,602; 61-215,603; 61-215,604; 61-215,605; 61-231,043; 61-283,607). The principle of such preparations is simple and entails performing at least two separate polymerization steps with first being an emulsifier-free emulsion polymerization to provide monodispersed "seeds" having uniform size, typically near 1 $\mu$m [Goodwin J.W. et al., *Brit. Polym. J.*, 5, 347 (1973)]. The seed particles are capable of absorbing about 0.5 to 30 times their own volume of a low molecular weight compound such as a solvent or a monomer. When the compound is a monomer and the absorption step is followed by a second polymerization, the process is called a "seeded polymerization". The degree of enlargement of the seeds is proportional to their swelling ability; this has not been found sufficient to produce beads with a diameter of at least 5 $\mu$m in one step.

A seeded polymerization is the easiest way to produce a product in which the size of the secondary beads exceeds that of the primary particles by factor of about two or less [Vanderhoff J.W., et al.; *J. Dispersion Sci. Technol.*, 5, 231, (1984)]. In this technique, the primary particles are swollen with a highly dispersed monomer-initiator mixture that is emulsion stabilized with a surfactant. The second polymerization of the swollen primary particles is then started by simply raising the temperature. The swelling process (involving only one mixture) has the advantage of simplicity, but has been limited in its ability to increase the size of the primary particle. Also, the beads produced have been non-porous.

Theoretical considerations [Ugelstad J. et al., *Makromol. Chem*, 180, 737 (1979)] based upon extended Flory-Huggins theory predict that a particle containing a substantial amount of an oligomer or an organic solvent which is substantially water-insoluble should exhibit an enormous increase in its swelling capacity by a monomer. The volume of the swollen particle may exceed the volume of the initial particle by up to 1,000 times. Subsequent polymerization of the monomer which has been absorbed into the swollen particle should result in the formation of a highly enlarged polymer particle that retains its original shape. In his two-step swelling process, Ugelstad also uses an approach similar to the traditional method of production of macroporous beads, i.e. one part of the liquid transferred into the primary seed during the second swelling step is a porogenic solvent. Due to the fact that the volume of the swollen particle is up to a few orders of magnitude larger than that of seeds, the concentration of the polymer originating from the primary particle in the swollen particle is then very low (less than 2%).

Another synthetic approach to uniform particles based upon a dispersion polymerization is described in U.S. Pat. No. 4,524,109. Its principle is simple. A solution of monomer in a solvent which dissolves the monomer but does not dissolve the polymer from the monomer is polymerized using a dissolved free radical initiator. During dispersion polymerization polymer chains grow in the solution until they become large. Then they start to precipitate. To prevent the precipitated polymer from aggregating into a formless mass, the polymerization mixture also contains a dissolved steric stabilizer and surfactant. The resulting particles retain uniform spherical shape and size up to about 10 $\mu$m. A serious drawback to the dispersion polymerization is that it is restricted to only monovinylic monomers, thereby prohibiting the synthesis of uniformly sized crosslinked polymers.

Almost uniform beads sized up to about 1 mm have also been produced by more unusual techniques. For example, a method is described by Rhim et al. [NASA Tech. Briefs, September 1989, p. 98] in which the organic part of the polymerization mixture containing monomers, an initiator, and optionally other compounds is continuously injected through a vibrating capillary onto the surface of liquid nitrogen and then polymerized by irradiation. The method results in beads with sizes that exceed the optimum for analytical chromatographic applications.

While there is no unique definition of macroporosity in the literature, it is generally accepted and will be for the purposes of this application that the main feature of a macroporous polymer is a solvent regain (ability to accommodate a nonsolvating solvent within the pores, which relates to the porosity) of greater than 0.1 ml/g, preferably greater than 0.5 ml/g. While some authors also quote data on minimum pore size (>5 nm) and specific surface area in the dry state (>5 m$^2$/g), these are only additive to the solvent regain property.

A copolymerization of mono- and di-vinyl compounds leading to a macroporous polymer is a special type of heterogeneous crosslinking polymerization. The reaction mixture will contain not only the monomers but also an inert solvent which will act as a porogen. After the polymerization starts in many sites at once, the polymerizing radicals add both the monovinylic monomer and crosslinking polyfunctional monomer. The pendant double bonds of the crosslinking polyfunctional monomer frequently react with another double bond of the same polymer chain rather than with that of another chain because of the relatively high dilution of the system (which means that the other polymer molecules are sometimes not available in the close vicinity of the reaction site). Thus, intramolecular crosslinking is more prevalent than is the case for the preparation of conventional gel polymers. When a thermodynamically good solvent is used as a porogen (e.g. toluene for styrene-divinylbenzene), the original nuclei are swollen by solvent and monomers which continue to polymerize and the crosslinking density continue to increase until it approaches the point where to polymer, even in the swollen state, cannot occupy all available space. As the polymerization proceeds further the chunks of primary gel shrink more and more, exuding the inert solvent component. The decreasing solvation results in separation of a polymer rich phase. This phase is still swollen and behaves almost as a liquid. Interfacial tension forces it to achieve the energetically most preferred shape, i.e. a sphere. This means that during a suspension polymerization a single observable droplet in fact consists of a very large number of spherical gel nuclei swollen with both the monomers and solvent, but separated by a liquid phase having a similar composition. These gel nuclei grow as the polymerization proceeds until they eventually touch each other. Because interpenetration of cross-linked molecules is not feasible, the entities (then called globuli) retain their identity until the end of the polymerization. Some macromolecules in the late state of polymerization can even grow through more than one microgel nucleus thus connecting them together. Also, when the crosslinking monomers, e.g. divinylbenzene, is more reactive than the monovinylic monomer, e.g. styrene, it polymerizes more rapidly and a significant part of the divinylbenzene is consumed at the initial stage of the polymerization. The remaining monomers are predominantly monovinylic and thus the globuli are less crosslinked at the outside in comparison to the inside.

Low molecular weight porogenic compounds produce macroporous polymers with high specific surface areas (up to >700 m$^2$/g), but the pore size is very small. Two methods are available to obtain macroporous products with large pores. The first entails using a large excess of non-solvent diluent as a porogen during the synthesis, while the second involves the use of polymers or polymer solutions as porogens.

Attempts have been made to use soluble polymers as porogenic agents in essentially the same manner as the thermodynamically poor solvents [Abrams J., *Ind Eng. Chem.*, 48, 1469 (1956)]. For example, Japanese Kokai No. 53,086,802 discloses a traditional aqueous suspension polymerization of styrene, ethylstyrene, and divinylbenzene in the presence of a large amount (40–60 vol. %) of an organic solvent and a small amount (<8 vol. %) of a linear polystyrene polymer. Also, soluble polystyrene acting as a porogen in the copolymerization of styrene with more than 10% divinylbenzene only when its molecular weight exceeds 50,000 and its weight fraction in the mixture was more than 10% is described by Seidl et al. [*Adv. Polym. Sci.*, 5, 113 (1967)]. When the amount of soluble polymer in the inert portion of the polymerization mixture is less than about 10%, or when its molecular weight is not high enough, the resulting polymers possess only very low pore volume, if any, [Revillon A. et al., *React. Polym.*, 10, 11 (1989); Seidl J. et al., *Chem. Prumysl* 13, 100 (1963)] and are not macroporous.

It has to be stressed that there is enormous change in the porous properties of a resulting macroporous polymer when the porogenic agent changes from pure low molecular weight solvent to a solution of linear polymer in the same solvent. A styrene-divinylbenzene copolymer prepared in the presence of toluene as a porogen has pores only in the range of about 3 to 100 nm, while the use of a 12% solution of polystyrene in toluene has been found to produce macropores up to about 2,000 nm.

The critical concentration of the soluble polymer necessary for creating a macroporous structure depends on the amount of crosslinking agent present in the polymerization mixture. When the chemical composition of the soluble polymer used as the porogen is very different from that of the synthesized polymer, the macroporosity begins to occur at both a lower molecular weight and lower concentration, due to the decrease in polymer compatibility. At the beginning of the polymerization, the porogenic polymer chains are dissolved in the monomers. During polymerization a phase separation occurs between the crosslinked copolymer produced and the original soluble polymer, resulting in a shrinking of the coil of the latter. The coiled polymer sterically prevents the network from reaching an ideal structure. The full extent of porosity is realized only when the original polymer is extracted from the matrix by means of one or more low molecular weight solvents. The internal structure of the macroporous polymers contains large agglomerates of globules alternating with large pores having diameters even greater than 1 μm. The porous copolymers previously obtained with the soluble polymer porogen have relatively small specific surface area despite reasonably high porosities that also suggest the presence of large pores.

DISCLOSURE OF THE INVENTION

The process of the present invention is directed to the production of macroporous polymer beads. The process generally comprises preparing a three phase emulsion, using soluble polymer particles, a monomer phase, and water. The soluble polymer particles both act as a means to control the shape and size of the final macroporous polymer beads and serve as a porogen. The soluble polymer particles undergo swelling by absorbing the monomer, which is thereafter polymerized. Finally the starting soluble polymer is extracted from the polymerized beads resulting in a final product of macroporous uniform-sized polymer beads. The macroporous polymer beads of this invention have a bead size of from about 2 to 20 μm. The majority of the beads are of substantially uniform size and shape. The macroporous beads have a solvent regain of at least about 0.1 ml/g, preferably at least about 0.5 ml/g, and most preferably at least about 1.0 ml/g. The polymer beads are particularly useful in water purification, high-performance liquid chromatography, size exclusion chromatography, perfusion chromatography, interaction modes of liquid chromatography, waste water treatment, polymer-supported organic reactions, enzyme immobilization, polymer catalysts, and other such applications.

DETAILED DESCRIPTION OF THE PREFERRED EMBODIMENT

More particularly, the process according to the present invention involves the formation of an emulsion containing three separate phases: monodispersed polymer particles of a soluble polymer, a monomer phase, and a water phase containing both a suspension stabilizer and an emulsifier. The process comprises forming a water dispersion containing the monodisperse polymer particles, which particles will act as the primary porogen in the process. The particles then go through a swelling stage, which can be carried out in one or more steps and during which the polymer particles solvate. It is presently preferred to carry out the swelling in two steps. First, the monomer or mixture of monomers, usually containing a dissolved free radical initiator, is added as an emulsion to the dispersion and the particles are allowed to absorb the monomer(s). This solvates the polymer particles and may even dissolve them, changing the particles to polymer-in-monomer droplets. Thereafter, a solvent is added and the swelling (size extension) is completed by absorption of the solvent by the monomer-polymer droplets. In an alternative, the solvent may be added first and then followed by the monomer or both the solvent and monomer may be added simultaneously. The monomers and solvents have to be miscible and be capable of solvating the polymer of the primary particles. When beads of a very small size are desired or when only a small enlargement of the size of the primary particle is desired, the addition of the organic solvent may be omitted thus simplifying the process.

After absorption of the monomer or mixture of monomers, initiator, and optional solvent into the polymer particles, polymerization is initiated. After polymerization, the initial soluble polymer is extracted from the resultant larger crosslinked polymer beads using a suitable solvent to produce the desired final macroporous beads.

The starting soluble polymer particles used in the process of the present invention serve to control the shape and size distribution of the final product. They also serve as a primary porogen. Soluble polymer particles useful herein include polymers and copolymers containing, for instance, styrene or ring substituted styrenes, acrylates, methacrylates, dienes, vinylchlorides, or vinylacetate. It is presently preferred to employ a polystyrene or an acrylic polymer. The starting polymer particles can be prepared by any technique producing very uniformly sized particles, e.g. by conventional techniques such as emulsion or dispersion polymerizations. The polymer particles initially have a diameter from about 0.5 to 10 $\mu m$, more preferably of from about 1 to 6 $\mu m$, and most preferably of from about 2 to 5 $\mu m$. The initial particle size will, of course, depend upon the intended end use and size of the final macroporous beads. For example, to obtain a final bead size of about 5 $\mu m$, an initial particle size of at least 1.96 $\mu m$ is required. A 5 $\mu m$ bead is typically used in high-performance liquid chromatography.

The soluble polymer particles must be solvated by the solvent employed in this stage of the process. The organic component of the emulsified liquid phase is allowed to diffuse or absorb slowly into the polymer particles solvating them and increasing their size in a very uniform manner. Accordingly, the polymer particle size is increased during solvation without any appreciable change in the overall size distribution of the solvated particles. The polymer particles are generally present in the three phase emulsion in an amount of from about 1 to 5% by volume, more preferably in an amount of from about 2 to 4%.

In the process of the present invention, the amount of soluble polymer remaining in the polymer beads after polymerization is completed is generally from about 6 to 50% by weight, preferably from about 10 to 20%. This is an important number in the process of invention, since the soluble polymer will later be extracted to form the macropores in the uniformly spherical polymer beads of the present invention.

The swelling solvent employed in the present invention may be any suitable solvent such as toluene, 1-chlorodecane, 1-bromodecane, dibutyl phthalate, chlorobenzene or mixtures thereof which can solvate the polymer particles used. The volume of the volume of the initial polymer particles, preferably about 10 to 20%.

Suitable monomers which will be used to form the macroporous beads include vinyl monomers or more usually a mixture of vinyl monomers consisting of both a di- or polyvinyl monomer and a monovinyl monomer. Suitable divinyl components include, e.g. divinylbenzene, divinylpyridine, ethylene dimethacrylate, ethylene diacrylate, and divinylether. The monovinylic monomers will generally be chosen from the group comprising styrene, ring substituted styrenes, methacrylates, acrylates, conjugated dienes, etc. The crosslinking monomer is present in the monomer mixture in an amount of from 10 to 100% by volume. The total amount of monomers present in the three phase emulsion is calculated from the expected bead size taking into account the volume of the inert solvent and the volume of the primary particles themselves.

In addition to the primary components of the three phase emulsion of the present invention, the emulsion will also include both an emulsifier and a suspension stabilizer. Suitable ionogenic or non-ionogenic emulsifiers include such as sodium dodecyl sulfate, alkyl- or dialkyl phenoxypoly(ethyleneoxy)ethanol, and polyoxyethylene sorbitan esters of fatty acids. Suspension stabilizers of the sterical type which may be employed include such as polyvinylalcohol, polyvinylpyrrolidone, polydiethylacrylamide, poly(2-hydroxypropyl methacrylamide). The emulsifier is present in an amount of from 1 to 5 gl of the water phase while the concentration of the steric suspension stabilizer ranges from 5 to 30 gl of water phase.

Conventional polymerization initiators soluble in organic phase will also generally be employed to initiate polymerization inside of the solvated polymer particles. An initiator is most often present in an amount of from about 1 to 2 wt.% relating to the monomers contained in the system. Examples of suitable initiators include peroxides such as benzoyl peroxide, and lauroyl peroxide as well as azo compounds such as azobisisobutyronitrile. An inhibitor to the polymerization reaction may also be dissolved in the water to prevent any polymerization outside of the particles in the surrounding water phase. Suitable inhibitors include, for instance, sodium nitrite and copper (I) chloride.

According to the process of the present invention, the solvation steps are generally carried out at a temperature of from about 5° to 25° C. during a period of time of from about 10 to 100 hours. It is important that the solvation extend for a sufficient period of time that the transfer of the low molecular weight compounds (monomers, solvents) into the primary particles is essentially complete. This is apparent from the visual disappearance of the emulsified droplets. The specific time will vary depending upon the composition of the polymer particles, the solvent, and the monomers. The polymerization step is carried out in a conventional manner, generally at a temperature from about 50° to 90° C. for a period of from about 6 to 24 hours, depending on the initiator and monomers used, and in an inert gas atmosphere such as nitrogen or argon. After polymerization, the beads are washed with water to remove the emulsifier and steric stabilizers from the surfaces and then the soluble polymer of the starting particles is extracted with conventional techniques by using suitable solvents such as tetrahydrofurane, benzene, toluene, dioxane, mixtures thereof and the like. Thereafter, the beads are dried. The process produces macroporous polymer beads after in amounts of about 50 to 95 % of the weight theoretically possible based upon the weight of monomers used in the polymerization. The beads range in size from about 2 to 20 μm.

The process of the present invention will now be described with reference to the following non-limiting examples in which all parts and percents are by weight unless otherwise specified.

EXAMPLE I

Monodisperse polystyrene primary particles with a diameter of 1.4 μm were prepared by a standard emulsifier-free emulsion polymerization. In a 1000 mL round bottom reactor containing 700 mL of demineralized water in which 0.65 g sodium chloride was dissolved, 85 g purified styrene was added, and the mixture was bubbled with nitrogen for 30 minutes. The mixture was heated to 75° C. under stirring (350 rpm) and a deoxygenized solution of 0.5 g potassium persulfate in 65 mL water admixed. The polymerization proceeded at 75° C. and 350 rpm for 24 hours. The product was purified from the remaining salts by repeated centrifugation and redispersion by sonication in water until the supernatant was clear. The final dispersion contained 13.9 % solids after evaporation.

The yield from several different emulsifier-free emulsion polymerizations runs ranged from 75 up to 86% based upon the amount of styrene monomer utilized.

5 mL of the 13.9% solids polystyrene dispersion of above was treated for 6 hours with 7.6 mL toluene and 0.095 g benzoyl peroxide emulsified into 50 mL water containing 0.1 g sodium docecyl sulfate and 0.1 g 4-nonylphenoxypoly(ethyleneoxyethanol) IGEPAL® CO-720 using a Branson model 450 sonifier.

After the absorption of the solvent, the solvated particles were added to an emulsion containing 1.9 g styrene and 2.9 g technical divinylbenzene (55% divinylbenzene and 45% ethylstyrene) in 100 mL 0.25 wt.% water solution of sodium dodecyl sulfate prepared by similar sonification and stirred slowly for 24 hours at room temperature to absorb the monomers into the solvated particles.

The resulting dispersion was transferred to a 500 mL round bottomed glass reactor provided with an anchor shape stirrer and 40 mL 5 wt.% polyvinylalcohol solution in water added to stabilize the droplets of suspension and prevent coalescence during the suspension polymerization. The mixture was bubbled 20 minutes with nitrogen to remove dissolved oxygen and the reactor sealed.

The polymerization proceeded at 70° C. for 24 hours under continuous stirring (350 rpm). After polymerization the product was removed from the reactor and diluted with 200 mL methanol. The beads were washed by repeated decantation in water (3 times) to remove the surfactant and the suspension stabilizer, then by decantation (3 times each) in methanol, in tetrahydrofurane, and in methanol again, stirring the dispersion in every washing step prior to sedimentation at least for 1 hour, and then they were dried. Further extraction was done with toluene for 5 days under slow stirring. The final macroporous beads, having a composition of 40% styrene, 27% ethylstyrene, and 33% divinylbenzene, were obtained in 85% yield based upon the total weight of the monomers polymerized in this polymerization. The beads had an essentially uniform size of 3.3 μm with a coefficient of variation of 3.8. The bead size was estimated using a Coulter Counter apparatus and the coefficient of variation calculated from the distribution curve. The beads contained pores ranging in size from about 10 to 410 nm and exhibited a solvent regain (cyclohexane) of 1.3 ml/g.

EXAMPLE II 5 mL of polystyrene dispersion as in Example I (primary particles, 1.3 μm, 0.139 g/ml) were treated under slow magnetic stirring at room temperature with 2.4 g styrene and 2.5 g divinylbenzene emulsified by sonication in 75 mL water containing 0.1 g sodium dodecyl sulfate and 0.1 g IGEPAL CO-720 for 8 hours.

After the solvation with the monomers, the particles were added to an emulsion of 5 mL toluene, 2.6 mL dibutyl phtalate, and 0.18 g. lauroyl peroxide in 75 mL 0.25% water solution of sodium dodecyl sulfate and the stirring continued for another 8 hours.

The polymerization was done under similar conditions as in Example I with the exception that the polymerization temperature was 75° C. and time 26 hours. After applying the same purification method as in Example I, 2.49 g of polymer beads (52% yield based upon monomers) having an average diameter of 3.1 μm, coefficient of variation 3.5, were obtained. The beads have pores ranging from 5 to 400 nm (as determined from the reverse size exclusion chromatography using polystyrene standards and a cyclohexane regain of 1.3 ml/g.

EXAMPLE III

To 10.8 g technical divinylbenzene and 0.15 g. benzoyl peroxide homogenized into 60 mL 2% water solution of polyvinylalcohol placed in a 250 ml round bottomed stirred reactor, 5 mL uniform solution polystyrene particle dispersion (solid 0.165 g/ml, size 4.2 μm) were added and the mixture stirred slowly at room temperature for 24 hours. After dissolving 0.01 g sodium nitrite and flushing with nitrogen for 30 minutes, polymerization was initiated by heating the stirred mixture to 70° C. and continued for 24 hours. The purification method was similar to Example I. After repeated washing with methanol the original seed polymer was extracted 4 times with tetrahydrofuran and twice with toluene to unblock all pores. The final macroporous beads, 5.6 μm in diameter, coefficient of variation 4.3, were obtained in an amount of 10.3 g which is a 95% yield based upon monomers. The beads have pore sizes up to 500 nm and a solvent regain (cyclohexane) of 1.2 ml/g.

EXAMPLE IV

The macroporous polymer beads were prepared according to the process described in the Example III with the exception the monomer mixture used consisted of 40 wt.% styrene and 60% technical divinylbenzene. 1.5 wt.% benzoyl peroxide was used. The yield of the beads was 9.6 g (89% of monomers), having a diameter of 5.1 μm, coefficient of variation 5.0. The beads have pores ranging from 1.3 to 220 nm and exhibit a solvent regain (cyclohexane) of 0.86 ml/g.

EXAMPLE V

The macroporous polymer beads were prepared according to the process described in Example III with the exception that a monomer mixture was employed consisting of 9.9 ml ethylene dimethacrylate, and 0.6 ml glycidyl methacrylate. 0.15 g benzoyl peroxide initiator was used. 10 g of beads were obtained (95% yield) with a bead size of 6.6 μm having a coefficient of variation of 2.3. The pore size range of the beads determined by inversion size exclusion chromatography of dextran standards and low molecular weight sugars was from 1 to 352 nm. The beads have a water regain of 1.36 ml/g.

EXAMPLE VI 10 ml of a polystyrene dispersion which contains 1 ml of primary polystyrene particles having a diameter of 2.4 μm was admixed to an emulsion of 1 ml dodecylchloride, 3 ml toluene, and 0.1 g benzoyl peroxide in 20 ml 0.25% sodium dodecyl sulfate solution. Under slow mixing the particles absorbed within 16 hours all of the organic phase as revealed under an optical microscope.

5.5 ml of a mixture consisting of 60% glycidyl methacrylate and 40% ethylene dimethacrylate was sonicated in 55 ml of 0.25% sodium dodecyl sulfate solution and then diluted with another 75 ml sodium dodecyl sulfate solution of the same concentration The emulsion was admixed to the preswollen particles and slowly mixed for 10 hours.

To the dispersion of droplets, 60 ml of 4% polyvinylalcohol solution in water was added and the mixture transferred to a 250 ml laboratory glass reactor provided with an anchor type stirrer. The mixture was purged 15 minutes with nitrogen to remove residual oxygen, the reactor sealed, and under stirring the temperature raised to 70° C. The polymerization ran 15 hours.

Polymer beads were separated by centrifugation, washed three times with methanol, water, and methanol again. The polystyrene was then extracted with benzene for 7 days. The extracted beads were transferred to the methanol, washed twice with it and finally washed three times with water. The resulting uniform beads (78% yield) were 5 μm in diameter, coefficient of variation 3.6. The pore size range of the beads determined by inversion size exclusion chromatography of dextran standards and low molecular weight sugars was from 0.7 to 350 nm. The beads have a water regain of 1.35 ml/g.

EXAMPLE VII

Monodisperse particles were prepared by a standard dispersion polymerization of styrene. 0.25 g azobisisobutyronitrile was dissolved together with 3.5 polyvinylpyrrolidone (molecular weight 360,000), g methyl(trialkyl $C_8$-$C_{10}$) ammonium chloride [ADOGEN® 464]and 25 g styrene in 200 mL ethanol in a round bottom glass reactor provided with a stirrer. The polymerization was started by heating the solution to 75° C. and it proceeded for 24 hours. Then the contents of the reactor, which became milky white, was poured into a 800 mL beaker and diluted with 300 mL methanol. The particles were recovered by four times repeated sedimentation in a centrifuge, decanting the supernatant liquid and the remaining polymer was redispersed in methanol again. The last two steps were carried out with water instead of methanol. The 2.5 μm sized uniform particles were kept refrigerated in water.

10 mL of the polystyrene dispersion containing 12% solids was treated for 8 hours with 4 ml toluene and 0.1 g benzoyl peroxide emulsified into 50 mL water containing 0.125 g sodium dodecyl sulfate using sonication.

After absorption of the solvent the solvated particles were added to an emulsion containing 2 ml styrene and 4 ml technical divinylbenzene in 100 mL 0.25% water solution of sodium dodecyl sulfate located in the glass reactor and the mixture kept at slow stirring for 10 hours. Then the content of the reactor was diluted with 35 mL 5% polyvinylalcohol solution, bubbled with nitrogen for 30 minutes and sealed. The polymerization was conducted for 24 hours at temperature, 70° C.

The resulting beads were collected by centrifugation and washed three times with water and ethanol. The original soluble polystyrene was extracted by several portions of tetrahydrofurane within 10 days. The beads were finally washed twice with methanol and dried. The yield of 5 μm particles with a coefficient of variation 4.3 was 4.1 g. The beads contain pores ranging in size from 0.8 to 400 nm as determined by reverse size exclusion chromatography and showed a cyclohexane regain of 1.2 ml/g.

What is claimed is:

1. A process for producing macroporous polymer beads of substantially uniform size comprising (i) forming an aqueous dispersion of essentially monodisperse soluble polymer particles of a polymer which is soluble in water: (ii) substantially uniformly enlarging the size and shape of the particles by adding thereto at least one polyvinyl monomer and an initiator for polymerizing said monomer, (iii) polymerizing the monomer to form polymer beads which are insoluble in water; (iv) extracting the initial soluble polymer from the insoluble polymer beads to form the macroporous beads.

2. The process of claim 1, wherein the enlarging is performed in two stages, the first stage comprising solvation resulting from the absorption by the polymer particles of the at least one monomer and the second stage comprising solvation resulting from the absorption by the polymer particles of a solvent.

3. The process of claim 1, wherein the enlarging is performed in two stages, the first stage comprising solvation resulting from the absorption by the polymer particles of a solvent and the second stage comprising solvation resulting from the absorption by the polymer particles of at least one monomer.

4. The process of claim 1, wherein the soluble polymer particles comprise polymers and copolymers of monomers selected from the group consisting of styrene, ring substituted styrenes, acrylates, methacrylates, dienes, vinylchloride, and vinylacetate.

5. The process of claim 1, wherein the polyvinyl one monomer is a mixture of vinyl monomers.

6. The process of claim 1, wherein the amount of soluble polymer in the beads before extraction is from about 6 to 50% by volume of the beads.

7. The process of claim 1, wherein the polymer particles employed to start the process have a diameter of from about 0.5 to 10 μm and the resulting macroporous polymer beads have a diameter of from about 2 to 20 μm.

8. The process of claim 1, wherein the soluble polymer remaining after polymerization is extracted using a solvent selected from the group consisting of tetrahydrofurane, benzene, toluene, and dioxan.

9. The process of claim 1, wherein the polyvinyl monomer is selected from the group consisting essentially of divinylbenzene, divinylpyridine, ethylene dimethacrylate, ethylene diacrylate, divinylether, and mixtures thereof.

10. The process of claim 2, wherein the solvating solvent is selected from the group consisting essentially of toluene, 1-chlorodecane, 1-bromododecane, chlorobenzene, and dibutyl phthalate.

11. The process of claim 3, wherein the solvating solvent is selected from the group consisting essentially of toluene, 1-chlorodecane, 1-chlorododecane, 1-bromododecane, chlorobenzene, and dibutyl phtalate.

12. The process of claim 1, wherein the dispersion of soluble polymer particles contains about 1 to 20 wt % particles.

13. The process of claim 1, wherein the dispersion of soluble polymer particles contains about 10 to 15 wt % particles.

14. The process of claim 7, wherein the polymer particles have a diameter of from about 1 to 6 μm.

15. The process of claim 1, wherein the dispersion is an aqueous dispersion.

16. The process of claim 1, wherein prior to or as part of the enlarging step an emulsifier and a suspension stabilizer are further incorporated.

* * * * *

UNITED STATES PATENT AND TRADEMARK OFFICE
CERTIFICATE OF CORRECTION

PATENT NO. : 5,130,343
DATED : July 14, 1992
INVENTOR(S) : Frechet, et al

It is certified that error appears in the above-indentified patent and that said Letters Patent is hereby corrected as shown below:

Column 10, claim 1, line 4, after "is" delete "soluble" and insert --insoluble--

Column 10, claim 1, line 6, delete "at least one" and insert --a--

Column 10, claim 5, line 1, delete "one"

Signed and Sealed this

Twenty-second Day of March, 1994

Attest:

BRUCE LEHMAN

Attesting Officer     Commissioner of Patents and Trademarks